No. 809,125. PATENTED JAN. 2, 1906.
M. MORTENSEN.
CREAM COOLER AND AERATOR.
APPLICATION FILED MAR. 14, 1904.
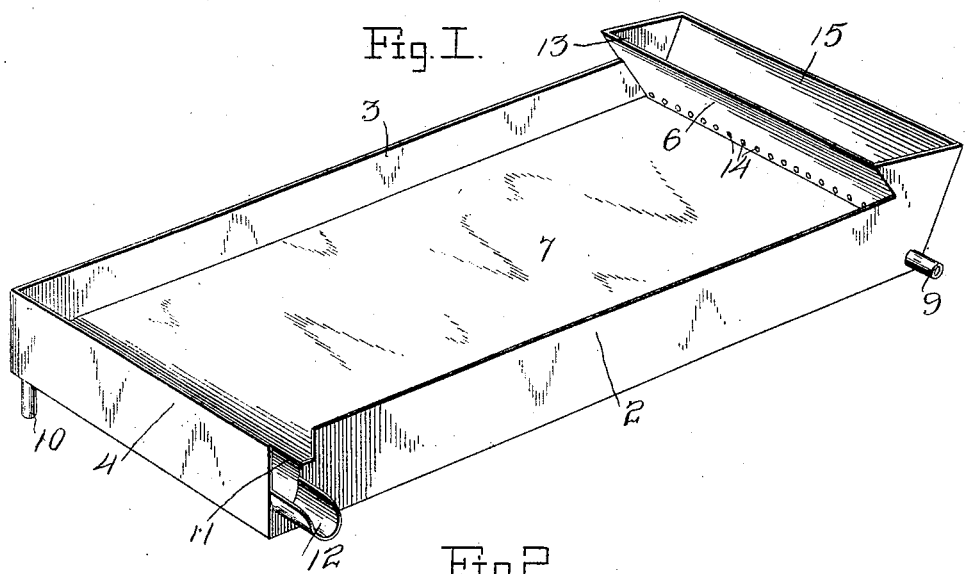
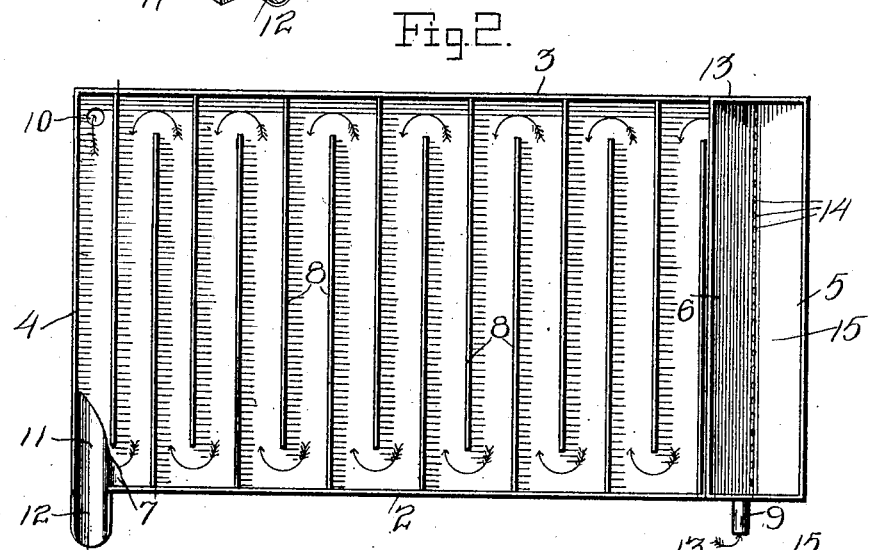
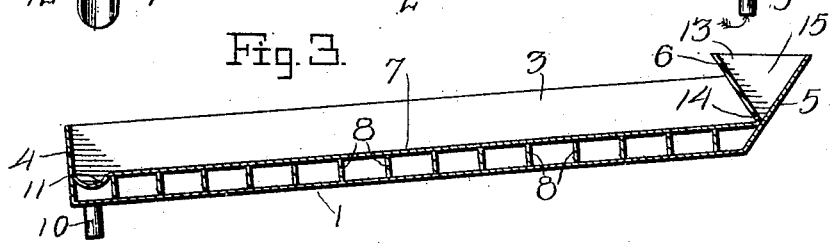
Inventor
Martin Mortensen.
Witnesses
E. K. Reichenbach.
James L. Norris, Jr.
By James L. Norris
Attorney

UNITED STATES PATENT OFFICE.

MARTIN MORTENSEN, OF SIOUX CITY, IOWA.

CREAM COOLER AND AERATOR.

No. 809,125.          Specification of Letters Patent.          Patented Jan. 2, 1906.

Application filed March 14, 1904. Serial No. 198,157.

*To all whom it may concern:*

Be it known that I, MARTIN MORTENSEN, a citizen of the United States, residing at Sioux City, in the county of Woodbury and State of Iowa, have invented new and useful Improvements in Cream Coolers and Aerators, of which the following is a specification.

This invention relates to cream coolers and aerators.

The object of the invention is to provide a device of the class referred to for cooling and aerating cream as it comes from the separator.

The invention further aims to provide a cream cooler and aerator which shall be extremely simple in its construction, strong, durable, efficient in its use, and comparatively inexpensive to manufacture.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is a perspective view of the device. Fig. 2 is a plan view with the bottom of the cream-compartment removed, and Fig. 3 is a longitudinal sectional view of the device.

Referring to the drawings by reference characters, the device consists of a substantially rectangular receptacle divided into two compartments, one of which may be termed the "compartment for the cream" and the other the "compartment for the cooling medium." The receptacle is constructed with a bottom 1, a pair of side walls 2 3, a rear end wall 4, and a forward end wall 5. The end wall 5 is of greater height than the end wall 4 and extends upwardly and outwardly at an inclination. Each of the side walls 2 3 has its end which is arranged adjacent to the end wall 5 inclined and of the same height as said end wall 5. Each of the side walls 2 3 is cut away, as at 6, at a point removed from the forward end thereof, and by such construction the forward end of each of the side walls 2 3 is enlarged. The function of the enlarged end of the side walls and the constructing of the end wall 5 of greater height than the end wall 4 and also at an inclination will be hereinafter referred to.

Within the receptacle 1 is suitably secured a partition 7, so as to form the said receptacle into a compartment for the cream and a compartment for the cooling medium. The partition 7 forms the bottom of the compartment for the cream and the top of the compartment for the cooling medium. The bottom 1 of the receptacle forms the bottom of the compartment for the cooling medium, and within said compartment is secured a series of deflectors 8, arranged in a staggered manner, so as to form a serpentine channel for the cooling medium, which preferably is water, and to furthermore cause the cooling medium to circulate throughout the compartment therefor.

Connected to the side wall 2 at its forward end is an outlet-pipe 9 for the cooling liquid, and secured to the bottom 1 at its lower end is an inlet-pipe 10 for the cooling medium.

The partition 7 at its rear end is formed with a transversely-extending collecting-trough 11, communicating with a discharge-spout 12 for the cream. The spout 12 projects away from the receptacle 1 and is suitably secured to the side wall 2 at the rear thereof, the latter being cut away to permit of the discharge of the cream from the trough 11 into the spout 12.

At the forward end of and within the receptacle 1 is secured an inclined plate 13, having a plurality of filtering-openings 14 near the lower edge thereof. The plate 13, in connection with the enlarged ends of the side walls 2 3 and also in connection with the end wall 5, forms a V-shaped trough 15 to receive the cream as it leaves the separator. The V-shaped trough with the filtering-openings, as before stated, is adapted to receive the cream from the separator, and as the cream leaves the trough 15 it is filtered and passes onto and over the upper surface of the partition 7 in a thin sheet and collected in the trough 11, thence discharged from the receptacle through the medium of the discharge-spout 12. It is desirable to cause the cream to flow in a thin sheet for two reasons: first, it will more readily expel the dissolved gases which fresh cream contains, and thereby improve the flavor of the cream, and, second, the cream is cooled to a temperature at which the fermentation present in it develops very slowly. This helps to prevent the cream from souring, and, furthermore, it prevents development or multiplication of disease-producing bacteria which exists in the cream.

The operation of the device is that the cooler is placed at an inclination and in such position that the V-shaped trough 15 will receive the cream as it comes out of the separator and so that the trough 15 will be a suitable height above the rear end of the cooler, the inclination of the device depending upon the conditions—that is to say, the temperature of the water, the temperature of the cream, the amount of cream, and richness of the cream. Water being supplied through the inlet 10, it will be caused to circulate upward through the cooling-compartment and will be discharged through the outlet 9. Owing to the circulation of the cooling medium through its compartment, it will cause the cream as it passes over the upper surface of the partition 7 to be cooled, and in this particular it will be observed that the water is the coldest as it enters the cooling device and the warmest as it leaves the said device. The result obtained by such procedure is that the warmest cream meets the warmest water and the coldest cream the coldest water.

It is thought that the many advantages of a cream-cooler constructed in accordance with the foregoing description, taken in connection with the accompanying drawings, can be readily understood, and it will furthermore be evident that changes, variations, and modifications can be resorted to without departing from the spirit of my invention or sacrificing any of its advantages, and I therefore do not wish to restrict myself to the details of construction hereinbefore described, and set forth in the annexed drawings, but reserve the right to make such changes, variations, and modifications as come properly within the scope of the protection prayed.

Having thus fully described my invention, what I claim as new, and desire to secure by Letters Patent, is—

1. A cream cooler and aerator consisting of a single receptacle having one of its end walls extending upwardly and outwardly at an inclination and one end of each of its side walls arranged adjacent to said inclined end wall enlarged and having the upper portion projecting rearwardly, a partition in said receptacle for dividing it into an upper and a lower compartment, said partition having one end formed in a semicylindrical manner to constitute a collecting-trough at the lower end of said receptacle, a filtering-plate having the lower portion thereof perforated, said plate arranged above said partition, secured to the inner face of the enlarged ends of said side walls, bearing against the inclined end wall and in connection with said inclined end wall and the enlarged ends of said side walls forming a filtering-trough, a spout communicating with said collecting-trough, a cooling-medium-supply pipe communicating with said lower compartment, and a cooling-medium-exhaust pipe communicating with said lower compartment.

2. A cream cooler and aerator comprising a single receptacle having one of its end walls extending upwardly and outwardly at an inclination and one end of each of its side walls arranged adjacent to said inclined end wall enlarged and projecting rearwardly, one of said side walls at its other end suitably cut away, a partition arranged in said receptacle and adapted to divide it into an upper and a lower compartment, said partition having one end thereof formed in a semicylindrical manner to constitute a filtering-trough registering with the cut-away portion of said side walls, deflecting-plates arranged in staggered relation with respect to each other and secured in the lower of said compartments, a filtering-plate having the lower portion thereof perforated, said plate arranged above said partition, secured to the inner face of the enlarged ends of said side walls, bearing against the inclined end wall and in connection with the inclined end wall and the enlarged end of said side walls forms a V-shaped filtering-trough, a spout communicating with said collecting-trough, a cooling-medium-supply pipe communicating with said lower compartment, and a cooling-medium-discharge pipe communicating with said lower compartment.

3. A cream cooler and aerator consisting of a single receptacle having one of its end walls extending upwardly and outwardly at an inclination, and one end of each of its side walls arranged adjacent to said inclined end wall enlarged, said enlarged portion of each of the end walls projecting rearwardly and having an inclined edge, the forward edge of each of said enlarged portions extending at an inclination, said inclined end wall secured to the forward inclined edge of said enlarged portions, a partition in said receptacle for dividing it into an upper and a lower compartment, said partition bent at its lower end to constitute a collecting-trough at the lower end of said receptacle, an inclined filtering-plate having the lower portion thereof perforated, said plate secured to the enlarged portions of the side walls, arranged above said partition, and in connection with said inclined end wall and said enlarged portions of the side walls forming a filtering-trough, a spout communicating with said collecting-trough, and means for supplying and exhausting a cooling medium to and from the lower of said compartments.

In testimony whereof I have hereunto set my hand in presence of two subscribing witnesses.

MARTIN MORTENSEN.

Witnesses:
C. W. TAYLOR,
CIN BAKER.